Aug. 14, 1923.
A. KRAUSE
1,465,013
ATTACHMENT FOR LIQUID CONTAINERS
Filed May 14, 1923
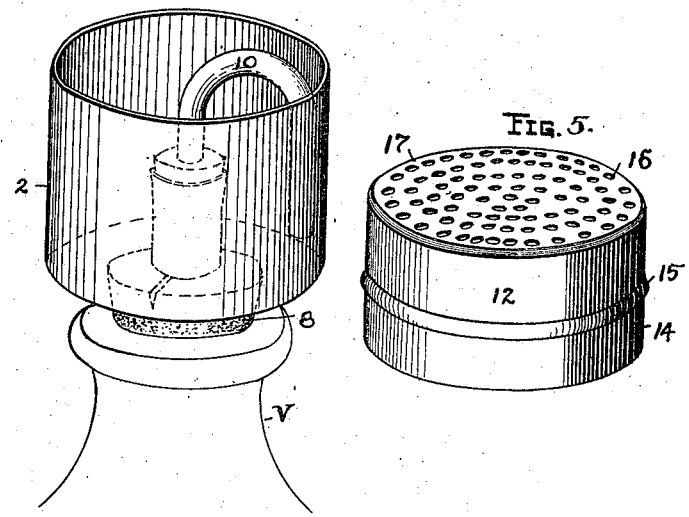
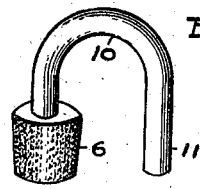
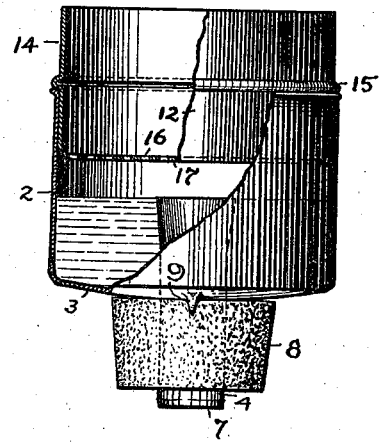
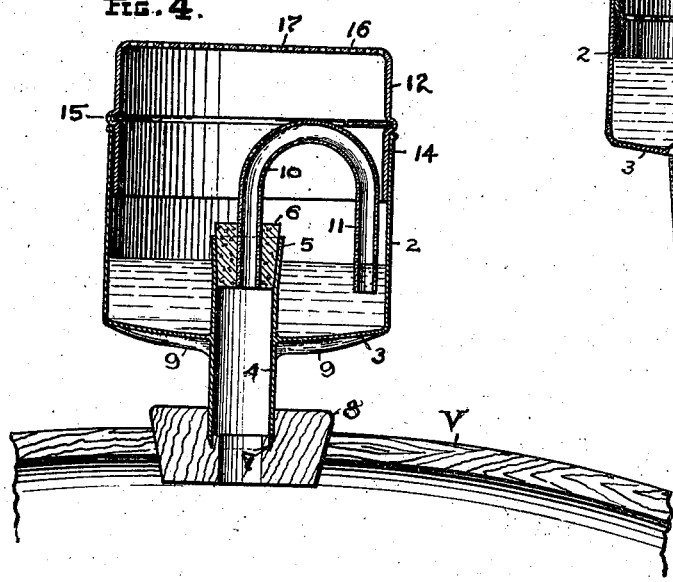
Inventor
A. KRAUSE
Attorneys Patented Aug. 14, 1923.

1,465,013

UNITED STATES PATENT OFFICE.

ANTON KRAUSE, OF CLEVELAND, OHIO.

ATTACHMENT FOR LIQUID CONTAINERS.

Application filed May 14, 1923. Serial No. 638,821.

*To all whom it may concern:*

Be it known that I, ANTON KRAUSE, a citizen of the United States, residing at Cleveland, in the county of Cuyahoga and State of Ohio, have invented certain new and useful Improvements in an Attachment for Liquid Containers, of which the following is a specification.

My invention relates to venting and sealing attachments for vessels containing liquids in a state of fermentation, and my object is to provide a simple device, which may be used with a cork or bung to permit convenient attachment to the vessel; which is particularly constructed to serve as a collecting cup for the material extruded or expelled from within the vessel during fermentation; which includes means adapted to seal the vessel while permitting the gases to escape during fermenting periods; which is designed to permit its use as a filling funnel; and which embodies a reversible cover adapted to serve either as a strainer in filling operations or as a protecting guard during collecting or fermenting periods.

In the accompanying drawing, Fig. 1 is a perspective view of my improvement attached to a jug or bottle, with the cover removed. Fig. 2 is a perspective view of the sealing crook or reverted vent tube. Fig. 3 is a side elevation, partly in section, of the device with the vent tube removed and the cover inverted to permit its use as a strainer. Fig. 4 is a vertical section affixed to the wood bung of a barrel and showing the cover and vent tube in place as used in fermenting operations. Fig. 5 is a perspective view of the cover.

The invention comprises a cup 2 which may be made of metal, pottery, glass or porcelain. The bottom 3 of this cup has a central opening therein formed by a tube 4 which extends both above and below the bottom substantially equal distances but only approximately half-way into the cup. The upper end 5 of tube 4 may be flared to receive a small cork 6, and the lower end is provided with a sharp circular edge 7 to permit the tube to be driven into a perforated plug or bung 8 with a fluid-tight sealing fit, see Fig. 4. Plug or bung 8 may be made of wood, rubber or other material and the tube may be forced entirely through the same as shown in Fig. 3, to bring its upper face in contact with bottom 3 which is provided with one or more sharp radial ribs 9 adapted to enter into the cork or bung and prevent it from turning on the tube when rotative force is applied to press the cork or bung to its seat. The smaller cork 6, which seats within the upper end 5 of tube 4, is affixed to one of the legs of a U-shaped vent tube 10, and this tubular U member tube is inverted to permit its outlet end 11 to extend downwardly into the cup below the upper end 5 of tube 4. Thus any substantial amount of liquid within cup 2 will seal outlet end 11 of the vent tube against the entrance of air into the vessel V, but gases under pressure will be permitted to escape. During intervals of excessive ebullition of fermentive liquids the vent tube 10 and its seating cork 6 may be bodily removed from the cup, and the extraneous matter or impurities rising to, or formed on, the surface of the liquid within the vessel may be expelled through central tube 4 and collected in cup 2. In the early and also latter stages of fermentation, any matter collected within cup 2 will attract flies and insects and I therefore provide a cover 12 in the form of a relatively deep cap having a straight side wall or flange 14 with an annular bead 15 at about its middle, and the closed end of this cap or cover is finely perforated to provide vent and strainer openings 16. When this slip cover is attached to cup 2 with the perforated end 17 uppermost, its side walls 14 forms an extension for the cup which makes a relatively deep collecting chamber. Violent ebullition and spurting of the liquid through tube 4 is restrained by the cover, but the gases are free to escape. In filling the vessel, cover 12 may be inserted within cup 2 in an inverted position, see Fig. 3. Used in this way the cover becomes a strainer and the cup a filling funnel.

The device may be made of various materials and changed or modified accordingly without departing from the spirit or scope of my invention. For example, in pressing or stamping cup 2 out of sheet metal the bottom ribs 9 may be struck up from the sheet-metal itself, and these ribs will reenforce the bottom so that considerable force may be applied to the device in making attachments.

What I claim is:

1. A sealing and venting attachment for vessels, comprising a cup having a ribbed bottom and a tubular extension depending from said bottom, a U-shaped vent tube connected with the upper end of said tubular extension within said cup, and a plug sleeve upon said extension and engaged with said ribbed bottom.

2. A sealing and venting attachment for vessels, comprising a cup having a vertical tube therein adapted to form a collecting chamber within the cup, and a reversible cover for said cup having a perforated end adapted to provide a guard and a strainer for the upper end of said chamber.

3. A sealing and venting attachment for vessels, comprising a cup having a tubular portion extending downwardly from its bottom adapted to facilitate a plug attachment with a vessel and having a tubular portion also extending upwardly into the cup to provide a collecting chamber, in combination with a vent tube of inverted U-shape detachably connected with said upwardly-extending tubular portion, and a perforated cover surmounting said cup and enclosing said vent tube.

4. A sealing and venting attachment for vessels, comprising a cup having a central tube projected downwardly from its bottom and extending upwardly part way into said cup, a plug sleeved upon the lower portion of said tube, and an inverted U-shape vent tube having a cork at one end in detachable sealing connection with the upper end of said central tube.

5. A sealing and venting attachment for vessels, comprising a cup having a central tube depending from its bottom and extending upwardly part way into said cups, in combination with a removable slip cover having one end open and its opposite end closed and perforated and provided with a stop shoulder at its side between its opposite ends, the said cover being adapted to be inverted and used as a strainer extension for said cup.

In testimony whereof I affix my signature hereto.

ANTON KRAUSE.